(12) United States Patent
Aoshima et al.

(10) Patent No.: US 9,391,835 B2
(45) Date of Patent: Jul. 12, 2016

(54) NETWORK SWITCH

(71) Applicant: HITACHI CABLE, LTD., Tokyo (JP)

(72) Inventors: Kenji Aoshima, Tsuchiura (JP); Chikara Sawaguchi, Tsukuba (JP)

(73) Assignee: HITACHI METALS, LTD., Tokyo (JP)

( * ) Notice: Subject to any disclaimer, the term of this patent is extended or adjusted under 35 U.S.C. 154(b) by 475 days.

(21) Appl. No.: 13/861,307

(22) Filed: Apr. 11, 2013

(65) Prior Publication Data

US 2013/0272112 A1 Oct. 17, 2013

(30) Foreign Application Priority Data

Apr. 16, 2012 (JP) .................................. 2012-93104

(51) Int. Cl.
  H04J 3/14 (2006.01)
  H04L 12/24 (2006.01)
  H04L 12/939 (2013.01)
  H04L 12/933 (2013.01)

(52) U.S. Cl.
  CPC .......... H04L 41/0654 (2013.01); H04L 49/557 (2013.01); H04L 49/1576 (2013.01)

(58) Field of Classification Search
  CPC ................. H04L 45/28; H04L 41/0654; H04L 2012/5627
  See application file for complete search history.

(56) References Cited

U.S. PATENT DOCUMENTS

| | | | |
|---|---|---|---|
| 2008/0126536 A1 | 5/2008 | Sakurai | |
| 2008/0240133 A1* | 10/2008 | Tanaka | H04L 45/245 370/401 |
| 2009/0282291 A1* | 11/2009 | Fitzgerald | H04L 49/351 714/39 |
| 2010/0284416 A1 | 11/2010 | Aoshima | |
| 2012/0320734 A1 | 12/2012 | Sakurai | |
| 2013/0201822 A1* | 8/2013 | Liang | H04L 45/245 370/228 |
| 2013/0272112 A1* | 10/2013 | Aoshima | H04L 41/0654 370/217 |

FOREIGN PATENT DOCUMENTS

| | | |
|---|---|---|
| EP | 1 993 253 A1 | 11/2008 |
| JP | 05-083280 A | 4/1993 |
| JP | 2005-020492 A | 1/2005 |
| JP | 2008-078906 A | 4/2008 |
| JP | 2008-136013 A | 6/2008 |
| JP | 2009-246524 A | 10/2009 |
| JP | 2010-263395 A | 11/2010 |
| JP | 2011-130155 A | 6/2011 |
| WO | WO 2012/037783 A1 | 3/2012 |

OTHER PUBLICATIONS

Japanese Office Action dated Mar. 3, 2015 (English-version).

* cited by examiner

*Primary Examiner* — Andrew Lai
*Assistant Examiner* — Zhiren Qin
(74) *Attorney, Agent, or Firm* — McGinn IP Law Group PLLC

(57) ABSTRACT

A network switch is provided which can shorten a time required for switching-over to a backup route when a failure has occurred in a port for which an LAG is set. The network switch includes a failure detection unit for detecting a port failure, and a forced transfer processing unit for, when a failure is detected in a port at a transfer destination as a target in trying to transfer a received unicast frame and when an link aggregation group is set for a plurality of ports including the relevant port at the transfer destination, forcibly transferring the received unicast frame to another port for which the same link aggregation group as that set for the relevant port at the transfer destination is set.

4 Claims, 4 Drawing Sheets

FIG. 4A

| INDEX (LAGID) | IDENTIFIER OF PORT AT TRANSFER DESTINATION | | | |
|---|---|---|---|---|
| | LBID0 | LBID1 | LBID2 | ... |
| ⋮ | | | | |
| 10 | 3.1 | 2.1 | 2.2 | ... |
| 11 | | | | |
| ⋮ | | | | |

FIG. 4B

| LINK STATE |
|---|
| ⋮ |
| 2.0: DOWN |
| 2.1: DOWN |
| 2.2: DOWN |
| 2.3: DOWN |
| 3.0: UP |
| 3.1: UP |
| ⋮ |

NETWORK SWITCH

The present application is based on Japanese patent application No. 2012-93104 filed on Apr. 16, 2012, the entire contents of which are incorporated herein by reference.

BACKGROUND OF THE INVENTION

1. Field of the Invention

The present invention relates to a network switch.

2. Description of the Related Art

A chassis type switch and a box type switch are known as examples of a network switch. The chassis type switch includes a plurality of line cards within a chassis (casing).

There is a network switch of the type including an FDB (Forwarding Database) and executing frame transfer in accordance with the FDB. The term "FDB" implies a database for defining correspondence between a destination MAC (Media Access Control) address and an output port (i.e., an identifier of a line card and an identifier of the output port at a transfer destination in the case of the chassis type switch, or only an identifier of the output port in the case of the box type switch, or an identifier of a Link Aggregation Group (hereinafter abbreviated to an "LAG")). The term "LAG" implies a technique of bundling a plurality of transmission lines together and virtually handling the bundled transmission lines as one transmission line. Plural ports set in the LAG are collectively handled as one port. In the chassis type switch, the FDB is installed in each line card.

The operation of frame transfer with the chassis type switch is described below as one example. When a unicast frame is received by the chassis type switch, the line card having received the unicast frame refers to the FDB, which is installed therein, and extracts the identifier of the line card and the identifier of the output port (or the identifier of the LAG) at the transfer destination corresponding to the destination MAC address of the received frame. The relevant line card then transfers the frame to the extracted transfer destination.

When the transfer destination (output port) extracted by referring to the FDB is the LAG, the identifier of the line card and the identifier of the output port at the transfer destination corresponding to a distributed ID, which is set in a predetermined manner, are extracted by referring to an LAG transfer destination table (i.e., an LAG-destined unicast transfer destination decision table) set for the relevant LAG. The LAG transfer destination table is a database for defining correspondence between the distributed ID and the respective identifiers of the line card and the output port at the transfer destination, and it is set for each LAG.

When the destination MAC address of the received frame is not registered in the FDB, a process of setting the relevant frame to be a destination unknown frame ("unknown") and transferring the destination unknown frame to all ports of the relevant line card other than a reception port thereof and to all other line cards is executed (such a process is called "flooding").

If a failure occurs in any port of the network switch, the unicast frame to be transferred to the port having caused the failure is not normally relayed and communication is interrupted. It is therefore desired that, if a failure has occurred in any port, switching-over to a backup route is performed in a time as short as possible.

In the related-art chassis type switch, if the occurrence of a failure in the line card within the device is detected, each FDB entry corresponding to the line card in which the failure has been detected is usually erased with software (such an erasing process is called "FDB flush"). When the FDB flush is executed, the unicast frame is subjected to the flooding as the destination unknown frame, and switching-over to the backup route is performed.

On the other hand, if a failure occurs in a port for which the LAG is set, the so-called degeneration of LAG is executed instead of the above-described FDB flush. More specifically, the LAG transfer destination table is rewritten with software such that any frame is not transferred to the port for which the failure has been detected (i.e., such that the output destination is switched over from the linked-down port to another linked-up port).

There are following patent documents as related-art information with regard to the invention of this application.

Japanese Unexamined Patent Application Publication No. 2008-136013

Japanese Unexamined Patent Application Publication No. 2010-263395

Japanese Unexamined Patent Application Publication No. 2009-027758

In the related-art network switch, however, if a failure occurs in a port for which the LAG is set, a problem arises in that about several hundreds milliseconds (ms) are taken from the detection of the port failure to change of the output destination (i.e., until rewrite of the LAG transfer destination table with software is completed), and that the communication is interrupted for a very long time. The reason will be described in detail below.

Let here consider the case where, in a chassis type switch 41 including three line cards 42a, 42b and 42c (LC1, LC2, and LC3), an LAG10 is set over two line cards 42b and 42c as illustrated in FIG. 5A.

When a unicast frame is input to the line card 42a (LC1), an FDB 43 installed in the line card 42a is first referred to for extraction of a transfer destination corresponding to a destination MAC address of the received unicast frame. Here, the transfer destination is assumed to be the LAG10.

Because the transfer destination is the LAG (i.e., the LAG10), an identifier of a line card and an identifier of an output port at the transfer destination corresponding to a distributed ID, which is set in a predetermined manner, are then extracted by referring to an LAG transfer destination table 44. Here, the transfer destination is assumed to be a port 1 of the line card 42b (LC2). The input unicast frame is transferred to the line card 42b, i.e., the transfer destination, and is output from the port 1 of the line card 42b.

Here, it is assumed that, as illustrated in FIG. 5B, a failure ("Link Down") has occurred in the line card 42b (LC2) of the chassis type switch 41. In such an event, all ports of the line card 42b (LC2) are regarded as causing failures.

In the related-art chassis type switch 41, the failure of the line card or the port is detected by a management card (not illustrated) within the chassis type switch 41. In the case assumed here, because the LAG (LAG10) is set for the line cards 42b and 42c (LC2 and LC3), the management card executes the degeneration of LAG, for example, by sending a control frame to all the line cards and by rewriting the LAG transfer destination table 44 in each line card. Communication of unicast frames destined for the line card 42b (LC2) is interrupted until the rewrite of all LAG transfer destination tables 44 is completed.

When the rewrite of the LAG transfer destination tables 44 is completed, the unicast frame is transferred to the line card 42c (LC3), whereby the switching-over of the route is performed.

Thus, in the chassis type switch 41, after detecting the failure of the port (or the line card) by the management card, the corresponding LAG transfer destination tables 44 in all the line cards have to be rewritten with software, and the operation of rewriting all the LAG transfer destination tables 44 take a time. Consequently, a time of about several hundred milliseconds is taken from the detection of the port failure to the switching-over of the route.

While the above description is made in connection with the chassis type switch 41 as one example, it is also required to rewrite an LAG transfer destination table with software in the box type switch if a failure has occurred in a port for which an LAG is set. As in the chassis type switch 41, therefore, a time of about several hundred milliseconds is taken from the detection of the port failure to the switching-over of the route. Because communication is interrupted for a time from the detection of the failure to the switching-over of the route, the switching-over time is desirably as short as possible.

SUMMARY OF THE INVENTION

The present invention has been accomplished in view of the above-described situation in the art, and an object of the present invention is to provide a network switch capable of shortening a time required for switching-over to a backup route when a failure has occurred in a port for which an LAG is set.

To achieve the above object, the present invention provides a network switch including a failure detection unit for detecting a port failure, and a forced transfer processing unit for, when a failure is detected in a port at a transfer destination as a target in trying to transfer a received unicast frame and when an link aggregation group is set for a plurality of ports including the relevant port at the transfer destination, forcibly transferring the received unicast frame to another port for which the same link aggregation group as that set for the relevant port at the transfer destination is set.

The network switch may further include an LAG (link aggregation group) transfer destination table set for each link aggregation group and defining correspondence between a distributed ID and an identifier of each port at each transfer destination. In that case, when a failure is detected in the port at the transfer destination of the received unicast frame, the forced transfer processing unit may search the LAG transfer destination table related to the link aggregation group, which is set for the relevant port at the transfer destination, specify an identifier of a port where no failure occurs, and forcibly change the identifier of the port at the transfer destination of the received unicast frame to the specified identifier of the port.

The failure detection unit may store the occurrence or not of the port failure in a link table, and the forced transfer processing unit may specify the identifier of the port where no failure occurs, by repeating the steps of successively extracting identifiers of line cards, which are stored as the transfer destinations in the LAG transfer destination table, and referring to the link table for each identifier.

The network switch may be a chassis type switch including a plurality of line cards in a chassis, and the failure detection unit and the forced transfer processing unit may be included in each of the plural line cards.

The failure detection units in the plural line cards may mutually periodically transmit and receive a connectivity confirmation frame, including port failure information, among the line cards, thereby notifying the occurrence of the port failure to one another.

The failure detection unit may determine, when the connectivity confirmation frame is not received from a certain line card for a predetermined time, that failures have occurred in all ports of the relevant line card.

According to the present invention, the time required for the switching-over to the backup route when a failure has occurred in the port for which an LAG is set can be shortened.

BRIEF DESCRIPTION OF THE DRAWINGS

FIG. 4A illustrates one example of an LAG transfer destination table, and FIG. 4B illustrates one example of a link table.

DESCRIPTION OF THE PREFERRED EMBODIMENTS

An embodiment of the present invention will be described below with reference to the accompanying drawings.

Figure 1:
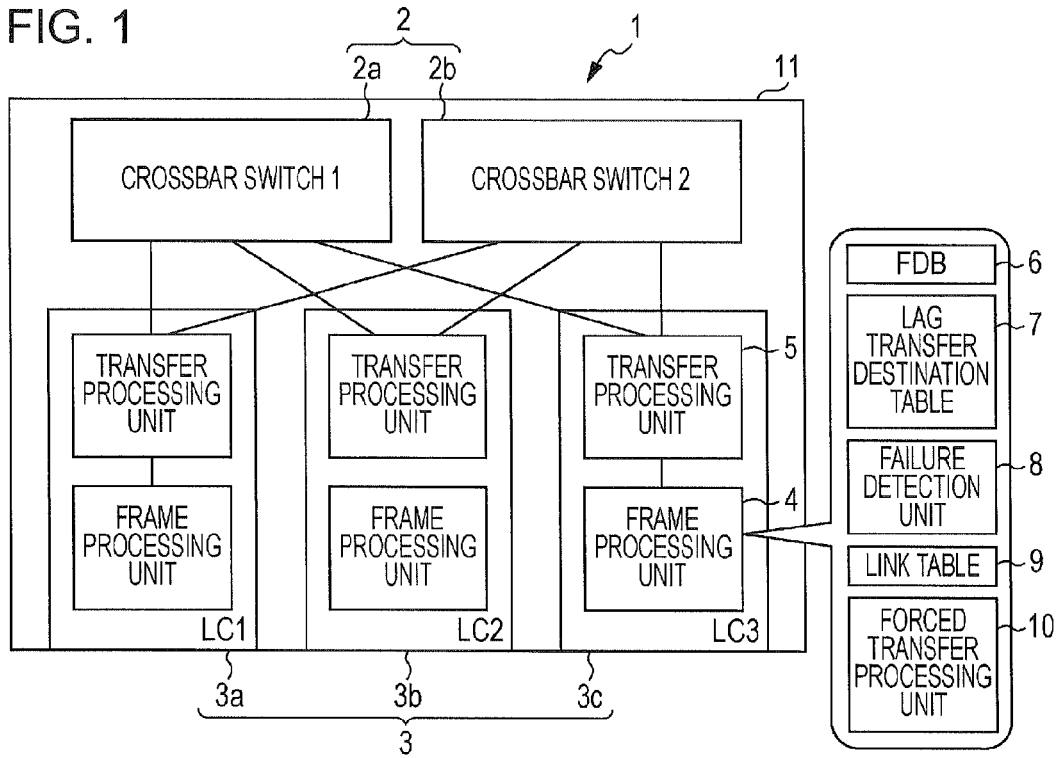
FIG. 1 is a block diagram of a network switch according to one embodiment of the present invention.

FIG. 1 is a block diagram of a network switch according to the embodiment. The embodiment is described, by way of example, in connection with the case where a network switch 1 is a chassis type switch.

As illustrated in FIG. 1, the network switch 1 includes a plurality of line cards 3 within a chassis 11. While FIG. 1 illustrates the case including three line cards 3a to 3c (LC1, LC2 and LC3), the number of line cards 3 is not limited to three. The network switch 1 is applied to, for example, a ring network.

The line cards 3 are interconnected within the device (i.e., the network switch) via a crossbar switch 2 serving as a relay route. While FIG. 1 illustrates the case where each line card 3 includes two crossbar switches 2a and 2b (denoted respectively by a crossbar switch 1 and a crossbar switch 2 in FIG. 1) for redundancy of the relay route, the number of crossbar switches 2 is not limited to two.

Each line card 3 includes a frame processing unit 4 and a transfer processing unit 5.

The frame processing unit 4 refers to an FDB 6 and extracts an identifier of a port (respective identifiers of a line card 3 and a port in the case of the chassis type switch) or an identifier of an LAG at a transfer destination that corresponds to a destination MAC address of the received frame. Based on information of the extracted transfer destination, the frame processing unit 4 assigns, to the received frame, an intra-device transfer header including the type of the frame and the identifier of the port (or the respective identifiers of the line card 3 and the port) at the transfer destination, and then outputs the frame to the transfer processing unit 5.

The term "type of the frame" used herein is to identify, for example, whether the relevant frame is a unicast frame, a destination unknown frame, or a broadcast frame. As one example, the received frame is determined to be a unicast frame if the destination MAC address of the received frame is registered in the FDB 6, a destination unknown frame if the destination MAC address of the received frame is not registered in the FDB 6, and a broadcast frame if the destination MAC address of the received frame is a broadcast address.

In the embodiment, the frame processing unit 4 further includes an LAG transfer destination table 7 to be adaptable for the LAG. The LAG transfer destination table 7 is a database for defining correspondence between a distributed ID and the identifier of the port (or the respective identifiers of the line card 3 and the port) at the transfer destination. The LAG transfer destination table 7 is installed in each of the plural line cards 3 and is set for each LAG. When the transfer destination extracted by referring to the FDB 6 is the LAG, the frame processing unit 4 refers to the LAG transfer destination table 7 set for the relevant LAG, and extracts the identifier of the line card 3 and the identifier of the output port at the transfer destination corresponding to the distributed ID that is set in a predetermined manner. While various manners are proposed to determine the distributed ID, any desired one of them may be used optionally.

In addition, the frame processing unit 4 is designed to perform learning of the FDB 6 by correlating a transmission source MAC address of the received frame and a port having received the relevant frame with each other. Because a learning method of the FDB 6 is well known, the description thereof is omitted here.

The transfer processing unit 5 executes a frame transfer process in accordance with the intra-device transfer header that has been assigned by the frame processing unit 4. When the type of the frame in the intra-device transfer header is the unicast frame, the transfer processing unit 5 transfers the relevant frame to only the port at the transfer destination, and when the type of the frame in the intra-device transfer header is the destination unknown frame, it transfers the relevant frame to all ports of the own line card 3 other than a reception port thereof and to all other line cards 3 (though being limited to only ports having the same VLAN setting), (thus causing the flooding of the relevant frame).

The network switch (chassis type switch) 1 according to the embodiment further includes a failure detection unit 8, a link table 9, and a forced transfer processing unit 10.

The failure detection unit 8 detects a failure of the port and a failure of the line card 3. Herein, the failure of the line card 3 implies a state where a failure occurs in communication between the line cards 3, and it involves not only the case where a failure occurs in the line card 3, but also the case where a failure occurs in a relay route, etc.

In the embodiment, the failure detection unit 8 is included in each of the plural line cards 3, and it operates such that the line cards 3 mutually periodically transmit and receive a connectivity confirmation frame, including port failure information, among the line cards 3, thereby notifying the occurrence of a port failure to one another.

More specifically, when the connectivity confirmation frame is not received from a certain line card 3 for a predetermined time, the failure detection unit 8 determines that a failure has occurred in the relevant line card 3. If a failure has occurred in the line card 3, this is determined as implying that failures have occurred in all ports of the relevant line card 3.

The failure detection unit 8 is designed to store the occurrence or not of the port failure in the link table 9. The link table 9 is a database for defining correspondence between the identifier of the port (or the respective identifiers of the line card 3 and the port) and the occurrence or not of the port failure.

With the constitution described above, if a failure has occurred in a certain port, all the line cards 3 can detect the information regarding the occurrence of the failure at the relevant port, thus enabling the failure information to be shared among the line cards 3. The failure detection unit 8, the link table 9, and the forced transfer processing unit 10 are all included in the frame processing unit 4.

In the embodiment, the failure detection unit 8 transmits the connectivity confirmation frame at a transmission cycle of 1000 pps (i.e., once per 1 ms). Accordingly, the connectivity confirmation frame can be transmitted and received at very short intervals between the frame processing units 4 of the line cards 3 via the transfer processing units 5 and the crossbar switch 2, whereby the detection of a port failure and the detection of a failure of the line card 3 (including confirmation of integrity of the relay route) can be performed very quickly. In the embodiment, if the connectivity confirmation frame is not received from a certain line card 3 for 3.5 ms (3.5 times the transmission cycle of the connectivity confirmation frame), it is determined that a failure has occurred in the relevant line card 3.

Figure 2:
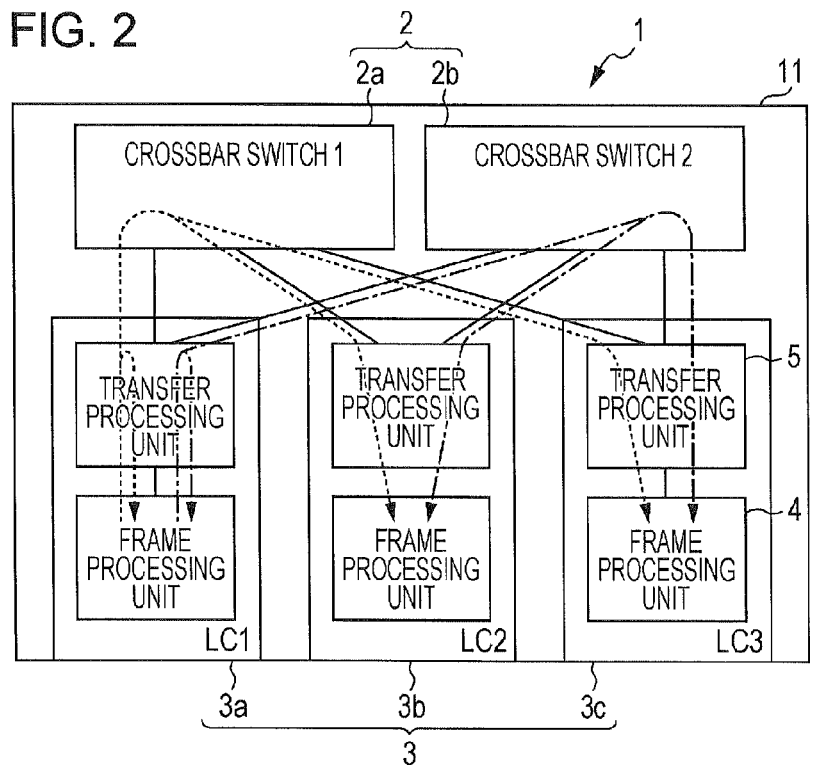
FIG. 2 illustrates routes of a connectivity confirmation frame in the network switch of FIG. 1.

FIG. 2 illustrates, as one example, routes of the connectivity confirmation frame transmitted from the frame processing unit 4 of the line card 3*a* (LC1) on the left side in the drawing. As illustrated in FIG. 2, because the embodiment includes two crossbar switches 2, the connectivity confirmation frame is transmitted through a route (denoted by dotted lines) passing through the crossbar switch 2*a* on the left side in the drawing, and through a route (denoted by one-dot-chain lines) passing through the crossbar switch 2*b* on the right side in the drawing.

The forced transfer processing unit 10 is included in each of the plural line cards 3, and it operates such that, when a failure is detected in a port at the transfer destination in trying to transfer the received unicast frame and when the LAG is set for a plurality of ports including the relevant port at the transfer destination, the received unicast frame is forcibly transferred to another port for which the same LAG as that set for the relevant port at the transfer destination is set.

In more detail, if a failure is detected in the port at the transfer destination of the received unicast frame, the forced transfer processing unit 10 operates to search the LAG transfer destination table 7 for the LAG (i.e., the LAG10 in the embodiment), which is set for the relevant port at the transfer destination, to specify the identifier of the port (or the respective identifiers of the line card 3 and the port) where no failure occurs, and to forcibly change the identifier of the port (or the respective identifiers of the line card 3 and the port) at the transfer destination of the received unicast frame to the specified identifier of the port (or the specified respective identifiers of the line card 3 and the port).

In the embodiment, the forced transfer processing unit 10 specifies the identifier of the port where no failure occurs, by repeating the steps of successively extracting the identifiers of the ports (or the respective identifiers of the line cards 3 and the ports), which are stored as the transfer destinations in the LAG transfer destination table 7, and referring to the link table 9 for each identifier.

As a result, the unicast frame destined for the failed port is output from the other port for which the same LAG as that set for the relevant port at the transfer destination is set, and switching-over to the backup route (i.e., pseudo regeneration of LAG) is performed. Because the change of the identifier of the port (or the respective identifiers of the line card 3 and the port) in the intra-device transfer header by the forced transfer processing unit 10 is executed with a hardware process, the switching-over to the backup route is momentarily performed after the detection of the port failure.

The operation of the network switch 1 according to the embodiment will be described below.

Figure 3:
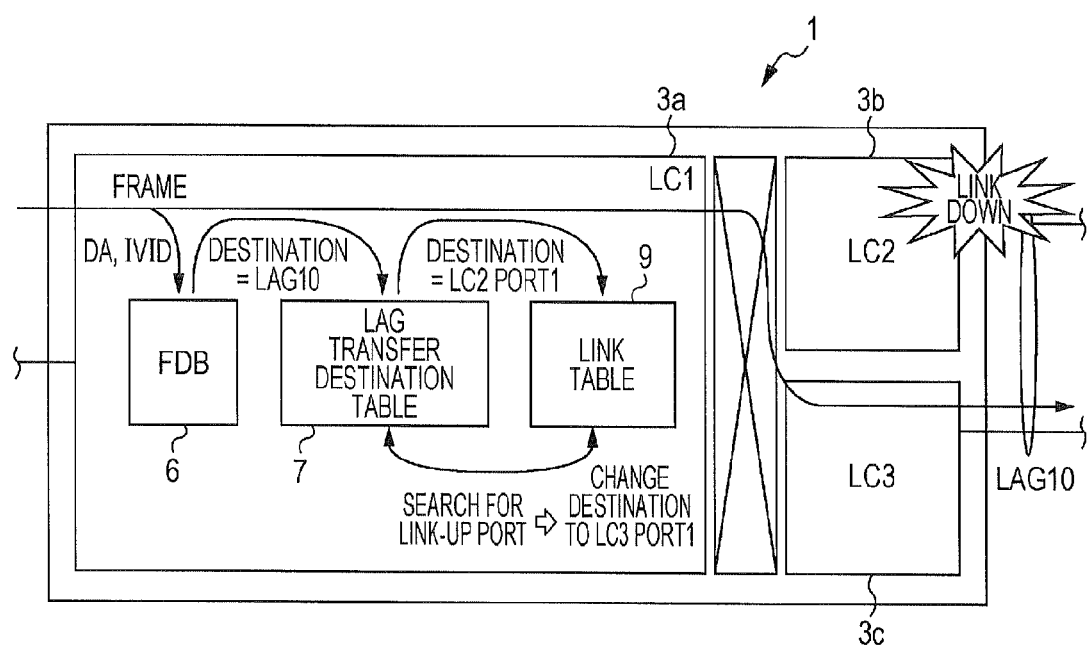
FIG. 3 is a block diagram to explain the operation of the network switch of FIG. 1.
Figure 5A:
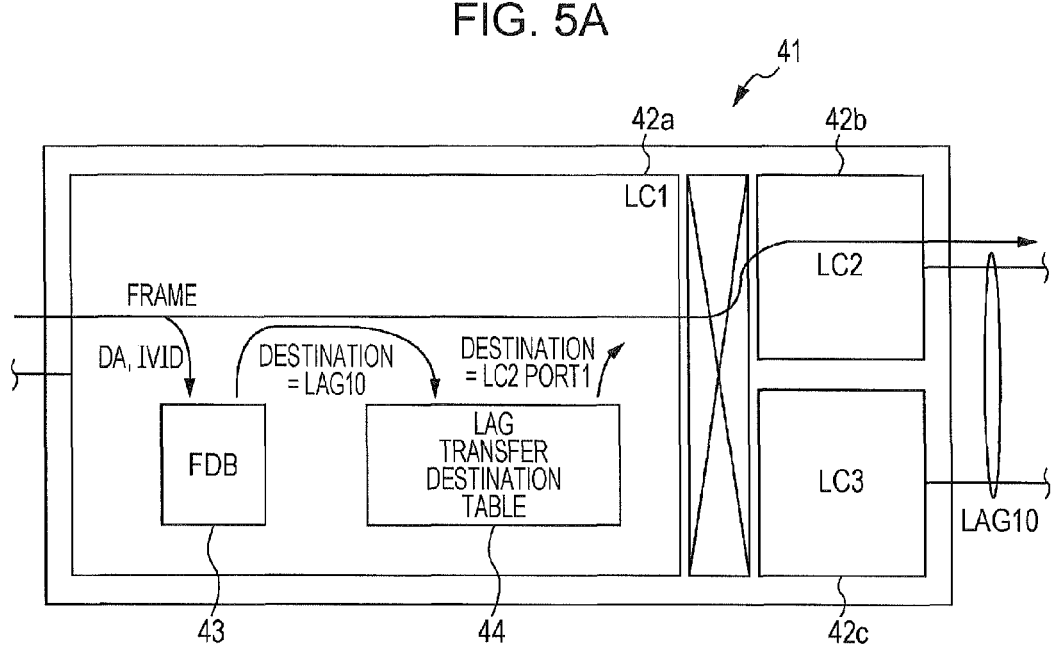
FIGS. 5A and 5B are block diagrams to explain the operation of a related-art network switch.
Figure 5B:
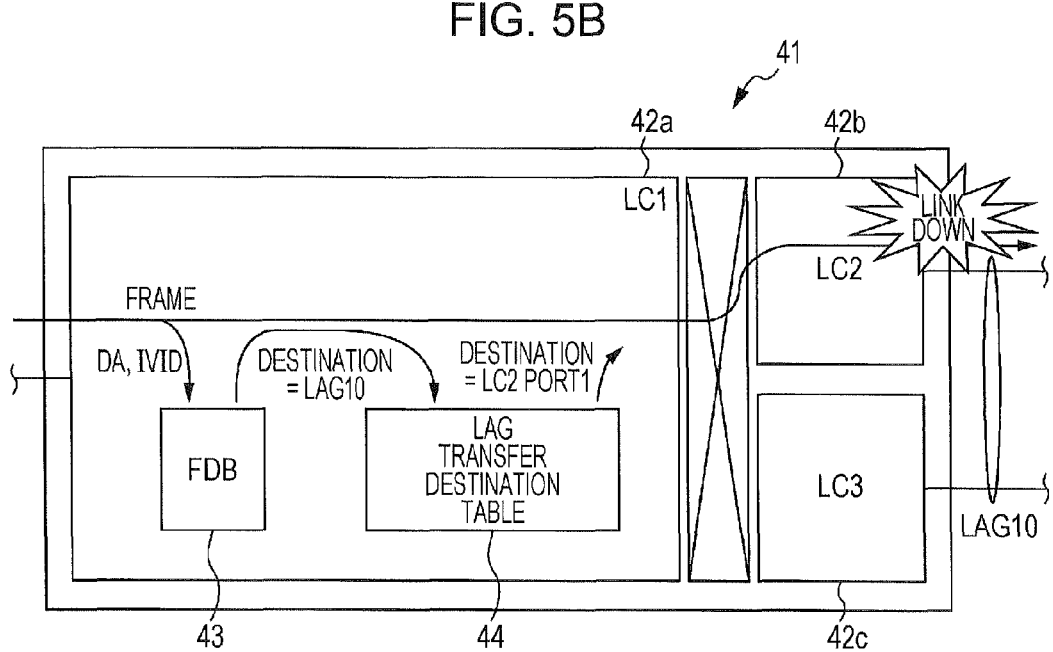

Let here consider the case where, as illustrated in FIG. 3, the LAG10 is set over the two line cards 3*b* and 3*c* (LC2 and LC3), and a failure has occurred in the line card 3*b* (LC2).

If the failure detection unit 8 in the line card 3*a* does not receive the connectivity confirmation frame from the line card 3*b* for a predetermined time (3.5 ms in the embodiment), it detects the occurrence of a failure in the line card 3*b*. The detection of the occurrence of a failure in the line card 3*b* is made substantially at the same time by all the line cards 3*a* and 3c in the network switch (chassis type switch) 1. The failure detection unit 8 in the line card 3a stores, in the link table 9, the above-described occurrence of the failure as the event that failures have occurred in all the ports of the line card 3b.

When a unicast frame is input to the line card 3a (LC1), the FDB 6 installed in the line card 3a (LC1) is first referred to for extraction of a transfer destination corresponding to a destination MAC address of the received unicast frame. Here, the transfer destination is assumed to be the LAG10.

Moreover, because the transfer destination is the LAG (i.e., the LAG10), an identifier of a port (or respective identifiers of a line card and a port) at the transfer destination corresponding to a distributed ID, which is set in a predetermined manner, is extracted by referring to the LAG transfer destination table 7 for the LAG 10. It is here assumed that the LAG transfer destination table 7 is set as illustrated in FIG. 4A, and that the distributed ID (LBID) is 1. In such a case, the transfer destination is a port 1 of the line card 3b (LC2). It is to be noted that, for example, 2.1 in FIG. 4A represents the port 1 of the line card 3b (LC2), i.e., that the numeral before the period (.) represents the identifier of the line card 3, and the numeral after the period (.) represents the identifier of the port.

Next, the forced transfer processing unit 10 refers to the link table 9 and confirms whether a failure occurs in the port at the transfer destination. Here, because the failure of the line card 3b (LC2) is detected, the data stored in the link table 9 indicates that, as illustrated in FIG. 4B, the failures have occurred in all the ports of the line card 3b (LC2). It is to be noted that, in FIG. 4B, "Down" represents "Link Down" (i.e., a state where the failure occurs), and "Up" represents "Link Up" (i.e., a state where the failure does not occur).

When the forced transfer processing unit 10 refers to the link table 9 and confirms that a failure occurs in the port (2.1) at the transfer destination, it searches the LAG transfer destination table 7 set for the LAG10 and specifies the identifier of the port where no failure occurs.

In the embodiment, the identifier of the port (or the respective identifiers of the line card 3 and the port) where no failure occurs is specified by repeating the steps of successively extracting the identifiers of the ports (or the respective identifiers of the line cards 3 and the ports) one by one, which are stored as the transfer destinations in the LAG transfer destination table 7 set for the LAG10, in the ascending order of the distributed ID from the smallest one, and referring to the link table 9. Here, a port 1 of the line card 3c (LC3) (the port being denoted by 3.1) is specified.

While, in the embodiment, the extraction of the identifier of the port (or the respective identifiers of the line card 3 and the port) from the LAG transfer destination table 7 is executed in the ascending order of the distributed ID from the smallest one, an extraction manner is not limited to the above-described one. The extraction may be executed in the descending order of the distributed ID from the largest one, or may be executed in the order of number of LAG member port without using the distributed ID.

After specifying the identifier of the port (or the respective identifiers of the line card 3 and the port) where no failure occurs, the forced transfer processing unit 10 forcibly changes the identifier of the port (or the respective identifiers of the line card 3 and the port) at the transfer destination of the received unicast frame to the specified identifier of the port (or the specified respective identifiers of the line card 3 and the port, i.e., the port 1 of the line card 3c (LC3) here).

Thereafter, the unicast frame for which the identifier of the port (or the respective identifiers of the line card 3 and the port) at the transfer destination has been changed is output to the transfer processing unit 5. Then, the unicast frame is transferred to the line card 3c (LC3) and is output from the port 1 of the line card 3c (LC3). A time taken from the detection of the failure of the line card 3b (LC2) until bypassing of the unicast frame to the line card 3c (LC3) where no failure occurs is about several tens milliseconds. Thus, a time of communication interruption can be greatly shortened in comparison with several hundreds milliseconds in the related art.

Thereafter, when the LAG transfer destination table 7 is rewritten with, e.g., a control frame sent from a management card (not illustrated), the line card 3b is removed from the transfer destinations in the LAG transfer destination table 7. Thus, the operation shifts to ordinary control as a result of regeneration of the LAG. In other words, the process executed in the present invention can be said as a process of forcibly bypassing the unicast frame, of which communication has been disabled, to another member port in the link-up state in a hardware manner during a time waiting for the process of software that executes the rewrite of the LAG transfer destination table 7.

As described above, the network switch 1 according to the embodiment includes the failure detection unit 8 for detecting a port failure, and the forced transfer processing unit 10 for, when a failure is detected in a port at the transfer destination as a target in trying to transfer a received unicast frame and when an LAG is set for a plurality of ports including the relevant port at the transfer destination, forcibly transferring the received unicast frame to another port for which the same LAG as that set for the relevant port at the transfer destination is set. As a result, a time required for the switching-over to the backup route in the event of the port failure, i.e., a time of communication interruption, can be greatly shortened in comparison with that required in the related art.

Furthermore, in the embodiment, the failure detection unit 8 is included in each of the plural line cards 3, and it operates such that the line cards 3 mutually periodically transmit and receive the connectivity confirmation frame, including port failure information, among the line cards 3, thereby notifying the occurrence of a port failure to one another. In addition, when the connectivity confirmation frame is not received from a certain line card 3 for a predetermined time, the failure detection unit 8 determines that failures have occurred in all ports of the relevant line card 3. As a result, the failure detection can be performed very quickly (e.g., within 3.5 ms), and the switching-over time to the backup route can be further shortened when the failure has occurred in the port or the line card 3. The time of communication interruption can be cut to a very short time, i.e., about several tens milliseconds (ms).

It is a matter of course that the present invention is not limited to the above-described embodiment, and that the present invention can be variously modified without departing from the gist of the invention.

For example, while the failure detection of the port and the line card 3 is performed using the connectivity confirmation frame in the above-described embodiment, the failure detection of the port and the line card 3 may be performed by another specific method.

Moreover, while the failure detection unit 8 is included in each of the plural line cards 3 in the above-described embodiment, the present invention is not limited to that arrangement, and the failure detection unit 8 may be included in the management card as in the related art. In that case, a time taken for each line card 3 to recognize a failure is prolonged, but a time until completion of the rewrite of the LAG transfer destination table 7, the rewrite having been essential so far, can be shortened. Thus, the switching-over time to the backup route, i.e., the time of the communication interruption, can be shortened in comparison with that in the related art.

While the embodiment has been described above, by way of example, in connection with the case where the present invention is applied to the chassis type switch, the present invention can be applied to the box type switch as well. The latter case can be realized with a simpler constitution because of no necessity of sharing the information regarding the occurrence of the failure by employing the connectivity confirmation frame, for example.

What is claimed is:

1. A network switch, comprising:
    a failure detector configured to detect a port failure;
    a forced transfer processor configured to, when a failure is detected in a first port at a transfer destination as a target in trying to transfer a received unicast frame and when a link aggregation group is set for a plurality of ports including the first port at the transfer destination, forcibly transfer the received unicast frame to a second port for which the same link aggregation group as that set for the first port at the transfer destination is set; and
    an LAG (link aggregation group) transfer destination table set for each link aggregation group and defining a correspondence between a distributed ID and an identifier of each port at each transfer destination,
    wherein, when the failure is detected in the first port at the transfer destination of the received unicast frame, the forced transfer processor searches the LAG transfer destination table related to the link aggregation group, which is set for the first port at the transfer destination, specifies an identifier of the second port where no failure occurs, and forcibly changes the identifier of the first port for the transfer destination of the received unicast frame to the specified identifier of the second port,
    wherein the failure detector stores an occurrence or not of the port failure in a link table,
    wherein the forced transfer processor specifies the identifier of the second port where no failure occurs, by repeating successively extracting identifiers of the plurality of ports, which are stored as transfer destinations in the LAG transfer destination table, and referring to the link table for each identifier, and
    wherein said successively extracting identifiers of the plurality of ports includes:
        when transferring the unicast frame to an LAG, the forced transfer processor selects one port as the transfer destination among the plurality of ports which include the LAG by referring to the LAG transfer destination table;
        after the forced transfer processor selects said one port, the forced transfer processor refers to the link table and determines whether the selected one port includes a failure occurrence;
        if the selected one port does not include the failure occurrence, the forced transfer processor transfers the unicast frame to the selected one port;
        if the selected one port includes the failure occurrence, the forced transfer processor again refers to the LAG transfer destination table and selects another port among the plurality of ports which include the LAG except the selected one port;
        if the selected one port includes the failure occurrence, after selecting said another port, the forced transfer processor refers to the link table and determines whether the selected another one port includes the failure occurrence; and
        if the selected another one port does not include the failure occurrence, the forced transfer processor transfers the unicast frame to the selected another one port.

2. The network switch according to claim 1, wherein the network switch comprises a chassis type switch including a plurality of line cards in a chassis, and
    wherein the failure detector and the forced transfer processor are included in each of the plural line cards.

3. The network switch according to claim 2, wherein the failure detectors in the plural line cards mutually and periodically transmit and receive a connectivity confirmation frame, including port failure information, among the line cards, thereby notifying the occurrence of the port failure to one another.

4. The network switch according to claim 3, wherein, when the connectivity confirmation frame is not received from a certain line card for a predetermined time, the failure detector determines that failures have occurred in all ports of a relevant line card.

* * * * *